(12) United States Patent
Geschwindner

(10) Patent No.: US 11,207,720 B2
(45) Date of Patent: Dec. 28, 2021

(54) ROLL BODY FOR A HYDROSTATIC ROLLING TOOL AND HYDROSTATIC ROLLING TOOL WITH THE ROLL BODY

(71) Applicant: Schaeffler Technologies AG & Co. KG, Herzogenaurach (DE)

(72) Inventor: Peter Geschwindner, Erlangen (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 0 days.

(21) Appl. No.: 16/973,310

(22) PCT Filed: May 9, 2019

(86) PCT No.: PCT/DE2019/100418
§ 371 (c)(1),
(2) Date: Dec. 8, 2020

(87) PCT Pub. No.: WO2019/242791
PCT Pub. Date: Dec. 26, 2019

(65) Prior Publication Data
US 2021/0245213 A1    Aug. 12, 2021

(30) Foreign Application Priority Data
Jun. 19, 2018 (DE) ..................... 10 2018 114 689.2

(51) Int. Cl.
*B21B 27/02*    (2006.01)
*B23P 19/02*    (2006.01)
(Continued)

(52) U.S. Cl.
CPC ............ *B21B 27/02* (2013.01); *B23P 19/025* (2013.01); *B21D 13/045* (2013.01); *B21D 17/04* (2013.01)

(58) Field of Classification Search
CPC ........ B23P 19/02; B23P 19/025; B21D 13/04; B21D 13/045; B21D 17/04; B24B 39/04; B24B 39/045
(Continued)

(56) References Cited

U.S. PATENT DOCUMENTS 471,407 A * 3/1892 Westaway .............. B21D 17/04
72/179
4,922,739 A * 5/1990 Ostertag ................. B24B 39/00
72/80
(Continued)

FOREIGN PATENT DOCUMENTS

CN    106926090 A    7/2017
CN    107000014 A    8/2017
(Continued)

*Primary Examiner* — Jason L Vaughan

(57) ABSTRACT

A roll body for a hydrostatic rolling tool includes a center, an axis of rotation running through the center, and a machining zone for rolling a workpiece. The roll body is rotatable about the axis of rotation and the machining zone has a working profile line formed in a cross-section of the roll body. The working profile line has a first working arc extending around a first machining center and a second working arc extending around a second machining center. The first machining center is arranged offset to the center, and the second machining center is arranged offset to the center and offset to the first machining center. In an example embodiment, the roll body has a parallel to the axis of rotation, the first machining center lies in the cross-section on the parallel, and the second machining center lies in the cross-section on the parallel.

10 Claims, 5 Drawing Sheets

(51) Int. Cl.
*B21D 13/04* (2006.01)
*B21D 17/04* (2006.01)

(58) Field of Classification Search
USPC .................................. 492/1, 57, 58, 60, 16
See application file for complete search history.

(56) References Cited

U.S. PATENT DOCUMENTS

| | | | | |
|---|---|---|---|---|
| 4,947,668 | A * | 8/1990 | Ostertag | B24B 39/04 |
| | | | | 72/75 |
| 5,555,759 | A * | 9/1996 | Rosene | B21D 11/08 |
| | | | | 72/179 |
| 5,826,453 | A * | 10/1998 | Prevey, III | B24B 39/00 |
| | | | | 72/75 |
| 6,131,430 | A * | 10/2000 | Schneider | B21D 17/04 |
| | | | | 72/75 |
| 6,415,486 | B1 * | 7/2002 | Prevey, III | B23P 9/02 |
| | | | | 29/90.01 |
| 6,622,570 | B1 * | 9/2003 | Prevey, III | B23P 9/02 |
| | | | | 72/75 |
| 6,755,065 | B2 * | 6/2004 | Ostertag | B24B 39/06 |
| | | | | 72/75 |
| 6,796,156 | B2 * | 9/2004 | Natalis | B21C 51/005 |
| | | | | 29/90.01 |
| 7,685,717 | B2 * | 3/2010 | Shibata | B23P 15/003 |
| | | | | 29/898.066 |
| 2005/0107230 | A1 * | 5/2005 | Ostertag | B21H 7/185 |
| | | | | 492/1 |
| 2017/0348822 | A1 * | 12/2017 | Draese | B21B 27/00 |

FOREIGN PATENT DOCUMENTS

| | | |
|---|---|---|
| DE | 8809823 U1 | 11/1988 |
| DE | 10340267 A1 | 3/2005 |
| EP | 2666590 A2 | 11/2013 |
| EP | 3254773 A1 | 12/2017 |
| JP | S5519425 A | 2/1980 |
| WO | 2005023488 A1 | 3/2005 |

* cited by examiner

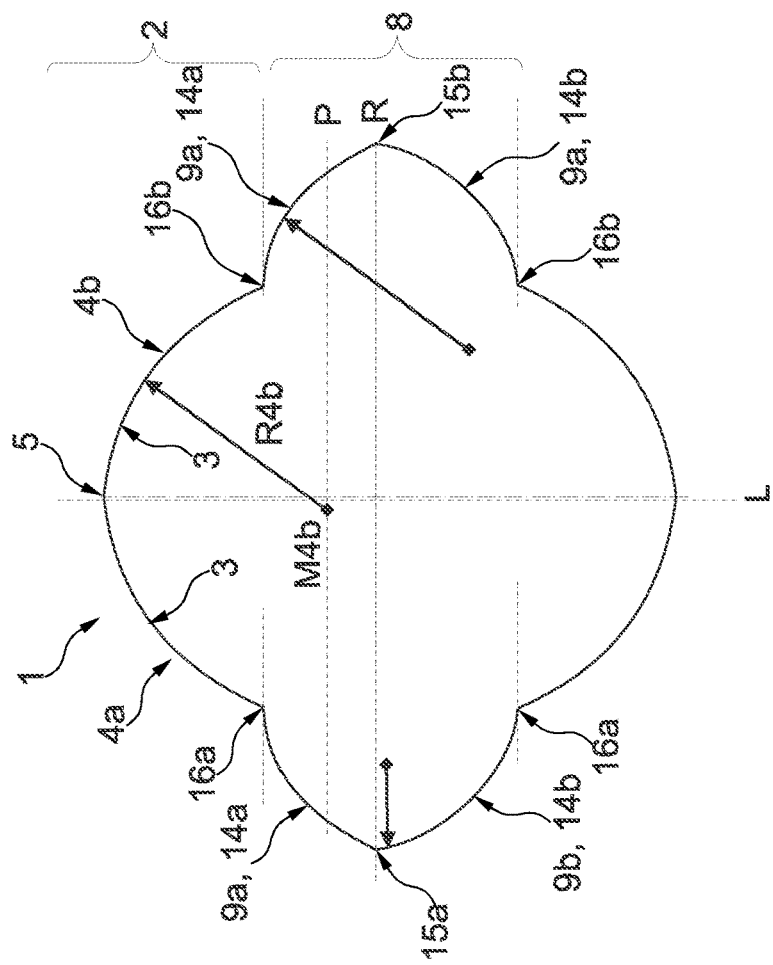
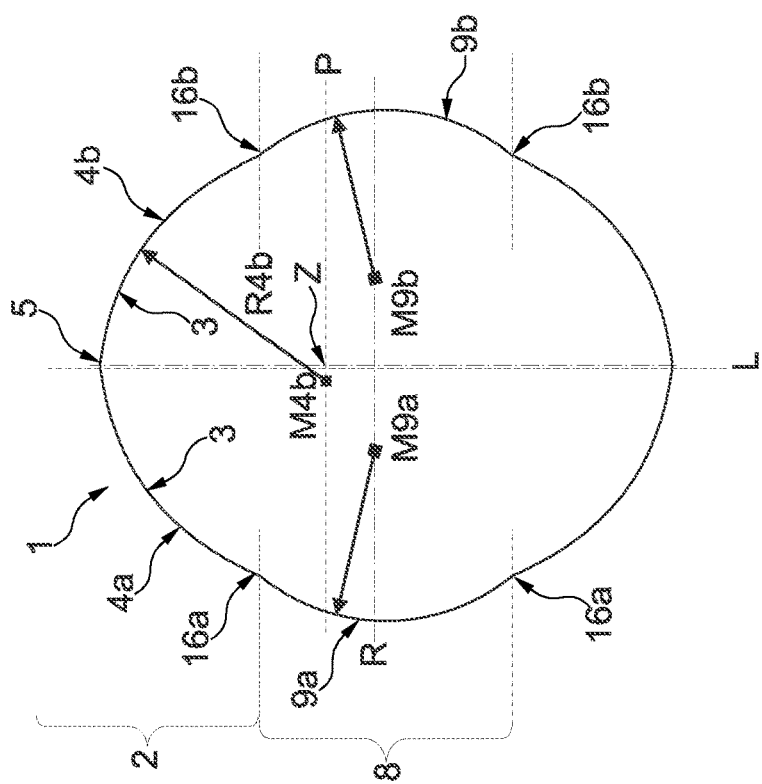

ROLL BODY FOR A HYDROSTATIC ROLLING TOOL AND HYDROSTATIC ROLLING TOOL WITH THE ROLL BODY

CROSS-REFERENCE TO RELATED APPLICATIONS

This application is the United States National Phase of PCT Appln. No. PCT/DE2019/100418 filed May 9, 2019, which claims priority to German Application No. DE102018114689.2 filed Jun. 19, 2018, the entire disclosures of which are incorporated by reference herein.

TECHNICAL FIELD

The disclosure relates to a roll body for a hydrostatic rolling tool and a hydrostatic rolling tool with the roll body.

BACKGROUND

It is known that hydrostatic rolling tools with a roll or a rolling ball are used for rolling and for introducing contours or holes into a workpiece.

The document DE 88 09 823 describes, for example, a rolling tool with a roll hydrostatically mounted in a roller head of the rolling tool. The document DE 103 40 267 A1 describes a hydrostatic rolling tool and a roll for rolling a workpiece. The roll has an operative perimeter which is located in a workpiece contact area of the roller which is spatially separated from a bearing contact area.

SUMMARY

The disclosure provides a hydrostatic rolling tool with a functionally improved roll body. A roll body for a hydrostatic rolling tool is proposed. The roll body can be arranged on the rolling tool for rolling, e.g., for soft and/or hard working, of a workpiece.

Example embodiments of the rolling tool include a tool head with a holder for the roll body. The roll body may be at least partially housed in the holder. A pressurized fluid can be introduced into the holder, through which the roll body can be subjected to force.

The roll body may have a spherical shape. It is specially designed as a contour ball. The roll body can be rotated around an axis of rotation, with the axis of rotation running through a center point of the roll body. The roll body has a central axis that extends perpendicular to the axis of rotation. The central axis runs through the middle of the roll body.

The roll body is designed to roll the workpiece. For working the workpiece, the roll body includes a machining zone. For example, a size of the roll body, in particular a quasi-diameter of the machining zone extending along the center line, is a maximum of up to 20 millimeters, e.g., a maximum of up to 10 millimeters or a maximum of up to 2 millimeters.

The machining zone has a working profile line formed in the cross-section of the roll body. The processing profile line consists of a first working arc and a second working arc. The first working arc extends around a first working center point and the second working arc extends around a second working center point.

According to the disclosure, the two working center points are offset from each other and from the center of the roll body. The two working center points may also be arranged offset to the central axis and/or the rotation axis.

In an example embodiment, the two working center points lie in the cross-section of the roll body on a straight line parallel to the axis of rotation. The the two working arcs may be symmetrical to each other, with the central axis forming an axis of symmetry for the two working arcs.

The first working arc and the second working arc may intersect at one point in the cross-section of the roll body. For example, they form a peak at the point of intersection. Optionally, the tip, a portion of the first working arc adjacent to the tip and a portion of the second working arc adjacent to the tip form a free area that interrupts and/or divides the machining zone. For example, during operation of the rolling tool for rolling, only the other sections of the first and second working arcs touch the workpiece, while the tip and adjacent sections of the working arcs are positioned without contact with the workpiece.

Within the scope of the disclosure it is possible that the tip is worn and/or flattened. For example, the working profile line in the cross-section of the roll body includes a line section that may be spaced from the axis of rotation, which is formed by removing and/or flattening the tip, for example. The line segment may be a line running parallel to the axis of rotation. Alternatively, the line segment can also be curved and/or bent.

The first working arc may end in a first end of the line segment and the second working arc may end in a second end of the line segment. Optionally, a transition radius is formed in a mouthpiece area of the first working arc and the first end of the line segment and a second transition radius is formed in a mouthpiece area of the second working arc and the second end of the line segment. The first transition radius and the second transition radius may be symmetrical to each other, with the central axis forming an axis of symmetry for the two transition radii.

In an example embodiment, the line segment forms one free area which interrupts and/or divides the processing area. For example, during rolling, only the working arcs touch the workpiece during operation of the rolling tool, while the line segment is arranged as a free surface without contact.

The roll body, which has, for example, the free surface, allows the introduction of holes, radii, internal threads, recesses, ellipses and/or contours with several offset radii into the workpiece during operation of the rolling tool. The holes that can be drilled in the workpiece with the aid of the roll body during operation of the rolling tool may have a relatively small diameter of 10 millimeters, e.g., 15 millimeters or 20 millimeters. However, when the rolling tool is in operation, the roll body can also be used for larger dimensioned applications, e.g., for larger components and for the corresponding shaft working.

In an example embodiment, the roll body has a retaining area. The roll body may be held in the retaining area on the rolling tool. For example, the rolling tool, especially the tool head, engages in the retaining area to hold the roll body in the holder.

In an example embodiment, the retaining area has a first holding profile line formed in the cross-section of the roll body and a second holding profile line formed in the cross-section of the roll body. Optionally, the first retaining profile line and the second retaining profile line are symmetrical to each other, with the central axis forming one symmetry axis. The first retaining profile line may have a first retaining circle arc or is designed as such. For example, the first retaining circle arch extends around a first support center, which lies on the axis of rotation. As an optional addition, the second retaining profile line has a second retaining circle arc or is designed as such. For example, the second retaining circle arch extends around a second support center, which lies on the axis of rotation.

The first and second retaining centers may be offset relative to each other and optionally also to the center of the roll body. It is possible that the two supporting centers and/or the two retaining circle arcs are symmetrical to each other, with the central axis forming one axis of symmetry.

In an example embodiment, each of the two retaining profile lines includes two retaining circle arcs whose retaining centers are offset against each other. For example, the support centers of the two retaining circle arcs of a retaining profile line are offset from the axis of rotation. Alternatively, each of the two retaining profile lines can include two oval or elliptical arcs. The two oval arcs or elliptical arcs of a retaining profile line may be symmetrical to each other, and the axis of rotation may form the axis of symmetry.

The two retaining circle arcs or oval or elliptical arcs of a retaining profile line may intersect and form another tip. For example, the first retaining profile line has a first additional tip and the second retaining profile line has a second additional tip. The first and second other tips may lie on the axis of rotation and are symmetrical to each other, with the central axis forming one axis of symmetry. For example, the two supporting arcs of a retaining profile line are symmetrical to each other, with the axis of rotation forming one axis of symmetry for this.

In an example embodiment, the first arc of the processing circle ends in the first retaining profile line and the second arc of the processing circle ends in the second retaining profile line. As a result, transition radii are formed, for example, in a mouthpiece area of the first working arc in the first retaining profile line and in a mouthpiece area of the second working arc in the second retaining profile line.

Another subject of the disclosure is a hydrostatic rolling tool with the roll body according to the description above. For rolling of the workpiece, the roll body is arranged and/or arrangeable on the rolling tool.

For example, the rolling tool includes an elongated base body. The rolling tool may have the tool head with the holder. For example, the tool head is arranged on the base body and specially integrated into it. For example, the receptacle is a negative form for the shape of the roll body, whereby the receptacle may be somewhat more voluminous than the roll body itself or whereby the receptacle is essentially similar to the shape of the roll body as a negative form. The roll body may be at least partially rotatably mounted in the holder. Optionally, the roll body can be removed from the holder and exchanged for another roll body, e.g. for maintenance work or to produce a different workpiece geometry.

For example, the rolling tool has a fluid channel that opens into the holder and through which the fluid can be introduced into the holder. As an optional extra, the rolling tool can be connected and/or coupled to a fluid and/or pressure generating source that provides the fluid and/or can apply pressure to it.

The pressurized fluid can be introduced and/or is introduced into the holder so that the roll body is hydrostatically supported in the holder and force is exerted by the fluid. For example, the rotation of the roll body around the axis of rotation in the holder can be caused by the pressurized fluid. Optionally, at least one relief channel is provided in the tool head. The relief channel may extend from the holder to the outside the tool head so that the fluid can escape laterally if the roll body does not come into contact with the workpiece.

In an example embodiment, the tool head for pre-positioning the roll body in the holder, e.g., in a cross-section of the tool head, includes a first centering device and a second centering device. The centering devices may be located on the tool head and/or protrude into the holder. The two centering devices in a cross section of the tool head in the receptacle may be opposite each other at the same height and are directed towards each other.

The first centering device may engage the first retaining profile line of the retaining area of the roll body and the second centering device may engage the second retaining profile line of the retaining area. The points of application of the two centering devices may lie on the axis of rotation.

The rolling tool may include several tool heads, e.g. two or three tool heads. The tool heads may be arranged on the base body of the rolling tool, e.g., integrated into it. The tool heads may be arranged offset to each other in the circumferential direction of the base body. For example, it can be achieved that rolling forces or passive forces cancel each other out. For example, two tool heads can be arranged 180 degrees apart in the circumferential direction and three tool heads 120 degrees apart in the circumferential direction. Optionally, the tool heads can be arranged axially offset to each other, especially along a longitudinal extension of the base body.

In an example embodiment, the tool head can additionally generate a radial stroke by pressurization with the fluid in order to compensate for differences in diameter. In addition, the tool head, in an example embodiment, can be rigid or freely rotatable in the base body.

BRIEF DESCRIPTION OF THE DRAWINGS

Further characteristics, advantages and effects of the disclosure are set out in the following description of example embodiments. In the figures:

FIGS. 4, 5 show the roll body from FIG. 3*a* with differently designed retaining areas;

DETAILED DESCRIPTION

Parts that correspond to each other or are identical are marked with the same reference marks in the illustrations.

Figure 1:
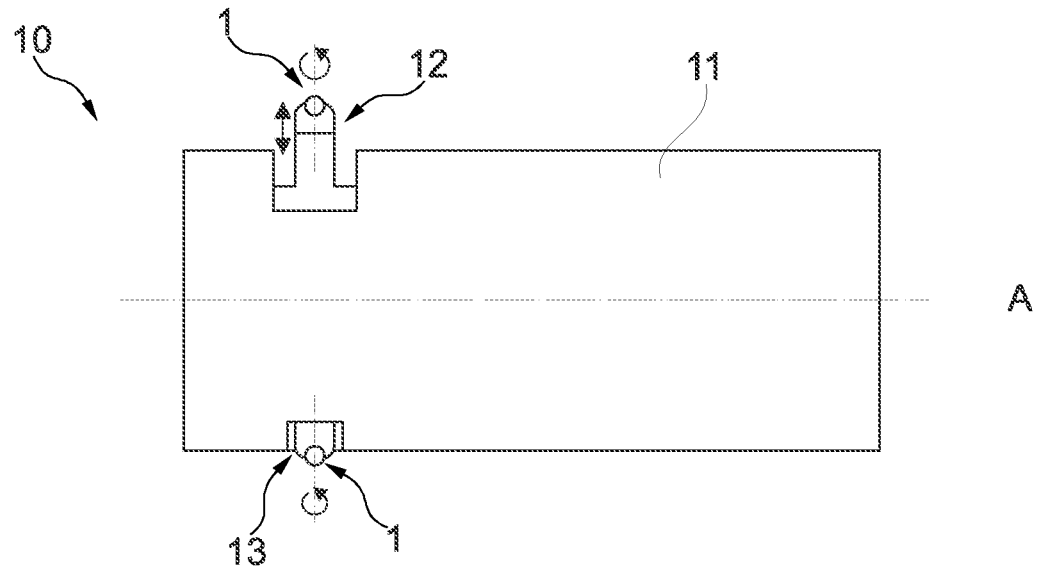
FIG. 1 shows a hydrostatic rolling tool with a base body and with two tool heads, on each of which a roll body is arranged.

FIG. 1 shows a longitudinal section through a hydrostatic rolling tool 10. Rolling tool 10 can be coupled and operated with a suitable machine tool, e.g., a lathe, especially a CNC machine. The rolling tool 10 includes an elongated circular cylindrical body 11 and two tool heads 12, 13. A roll body 1 is arranged on each tool head 12, 13. When operating the rolling tool 10, the roll body 1 is designed to roll a workpiece that is not shown. Rolling refers to soft or hard working, with which a wide variety of contour shapes, e.g., holes, radii, internal threads, recesses, ellipses and/or contours with several offset radii can be introduced into the workpiece. The holes to be drilled with roll body 1 may have a relatively small diameter of 10 millimeters, 15 millimeters or 20 millimeters, for example. Even larger components, e.g. shafts, can be machined with the rolling tool.

The two tool heads 12, 13 are arranged 180 degrees offset to each other in the circumferential direction of the base body 11. In a further design example according to FIG. 2, the tool heads 12, 13 can additionally be arranged axially offset to each other, e.g., along a longitudinal axis A of the base body 11. Alternatively the rolling tool 10 can have only one tool head 12 or more than two tool heads 12, 13.

Figure 3A:
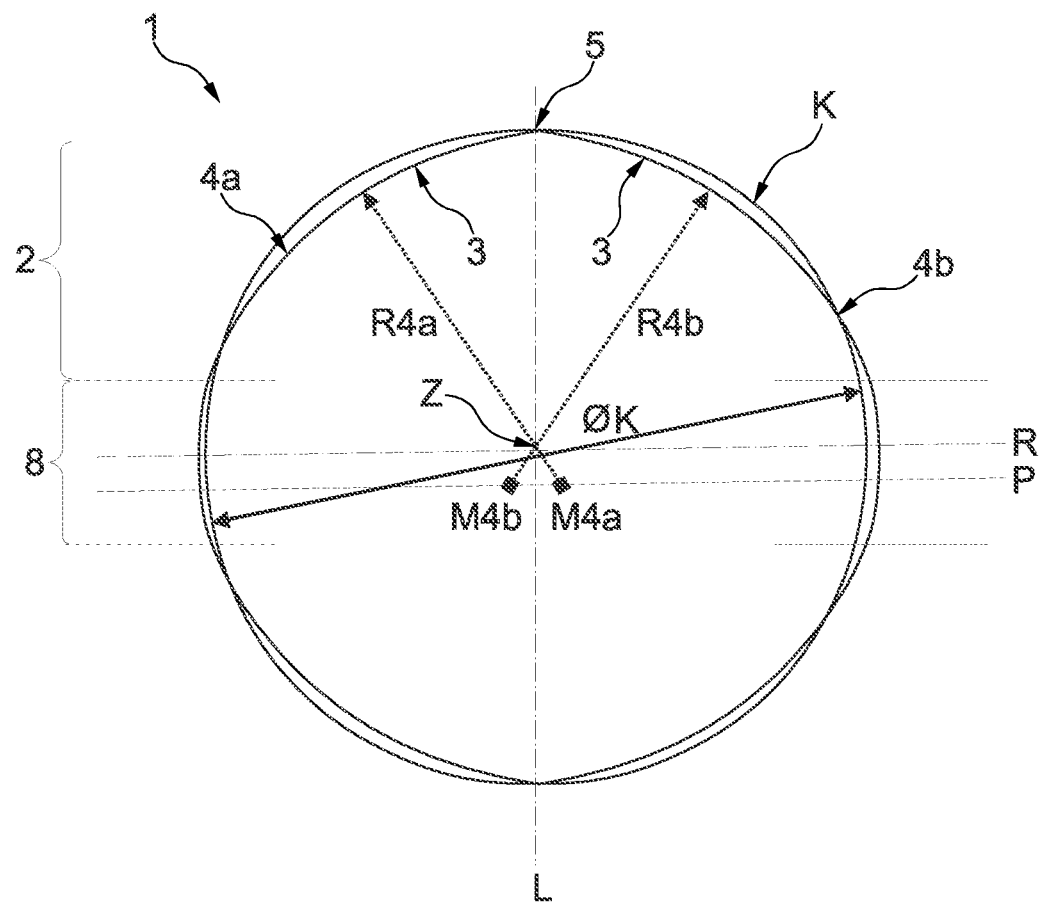
FIG. 3*a* shows a roll body with a machining zone in a first embodiment.

FIG. 3a shows a cross-section of the roll body 1. The roll body 1 is spherical, for example in the form of a profiled ball, the outer contour of which deviates from a ball K shown for comparison, but is essentially oriented to the outer contour of the ball K The roll body 1 has a center Z and a central axis L similar to the ball K. It can be rotated about an axis of rotation R during operation of rolling tool 10. The axis of rotation R runs through the center Z and extends at right angles to the central axis L.

Figure 2:
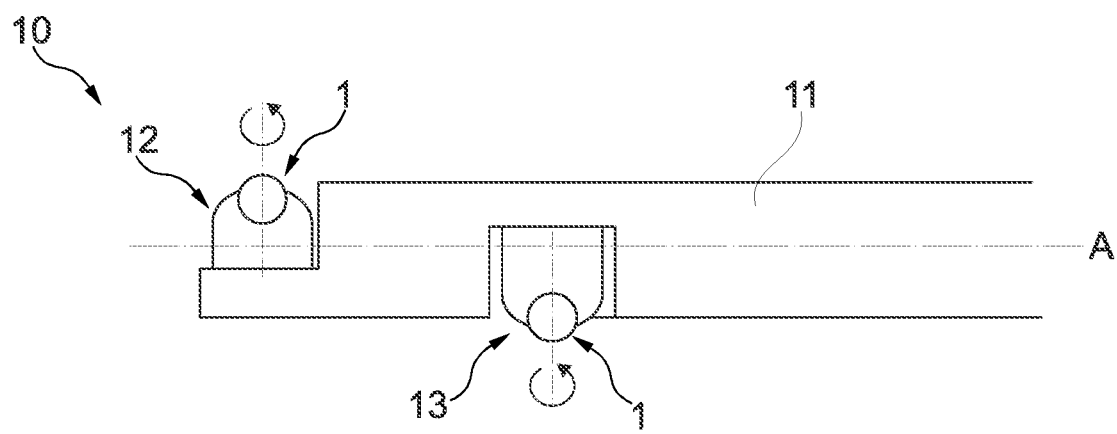
FIG. 2 shows the rolling tool shown in FIG. 1, with the rolling bodies arranged differently on the base body.
Figure 6B:
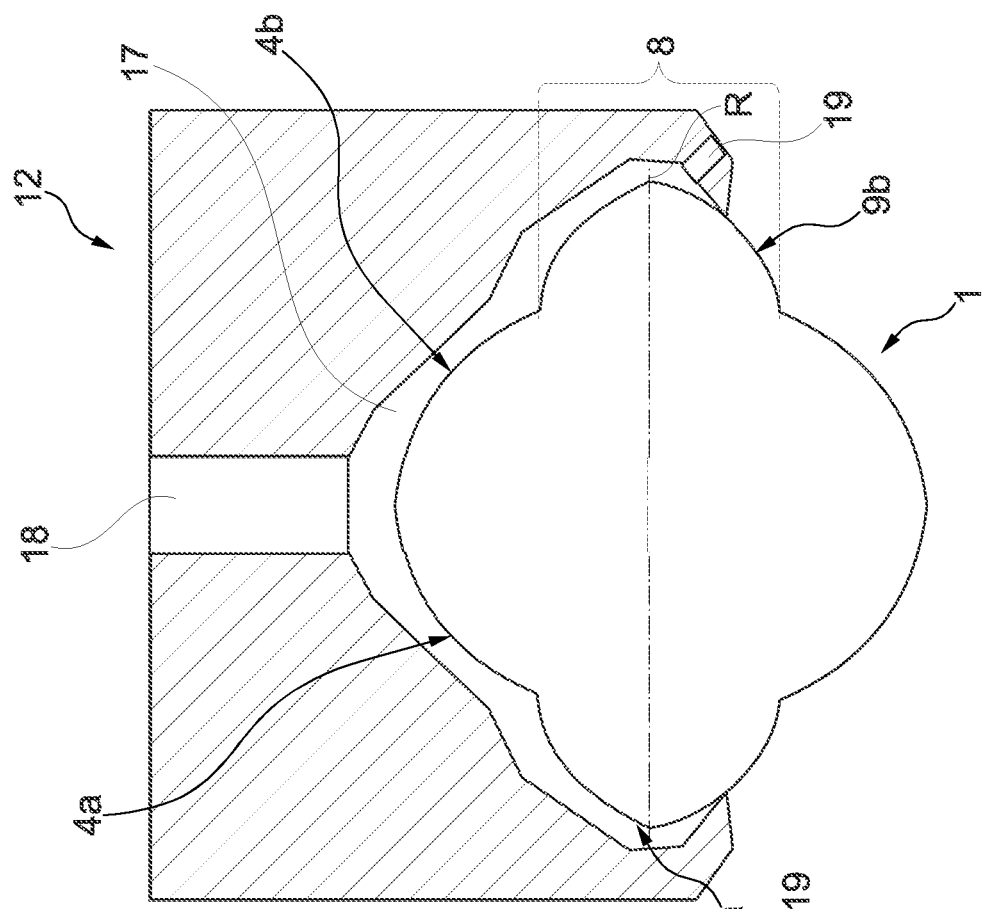
FIG. 6*b* shows a tool head of the rolling tool with a receptacle in which the roll body shown in FIG. 5 is accommodated.
Figure 6A:
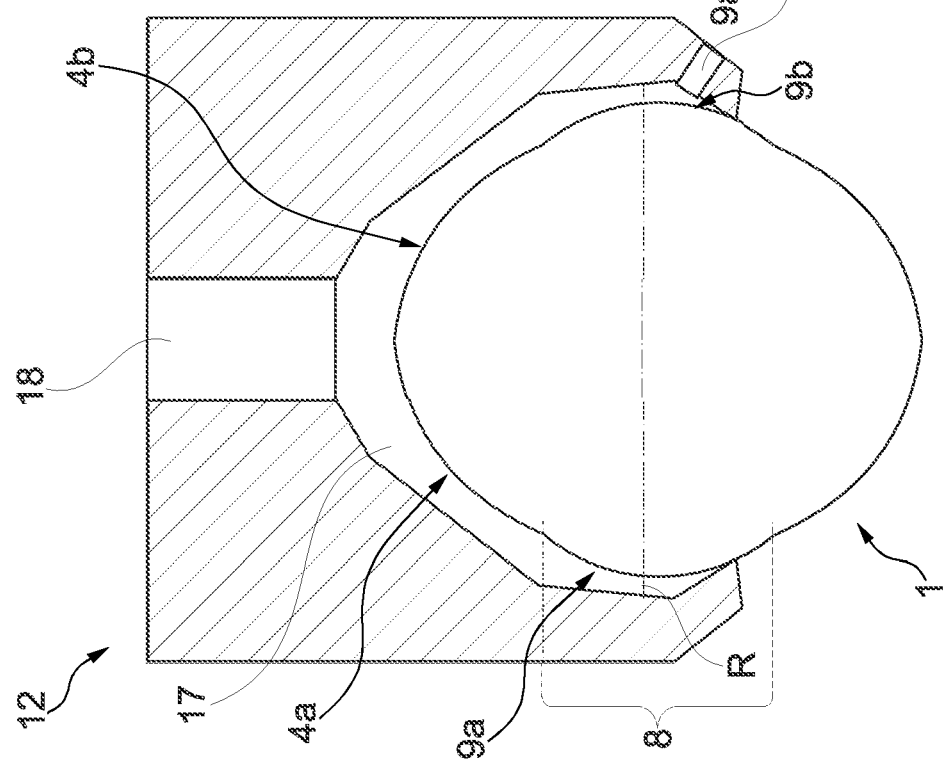
FIG. 6*a* shows a tool head of the rolling tool with a receptacle in which the roll body shown in FIG. 4 is accommodated.
Figure 7:
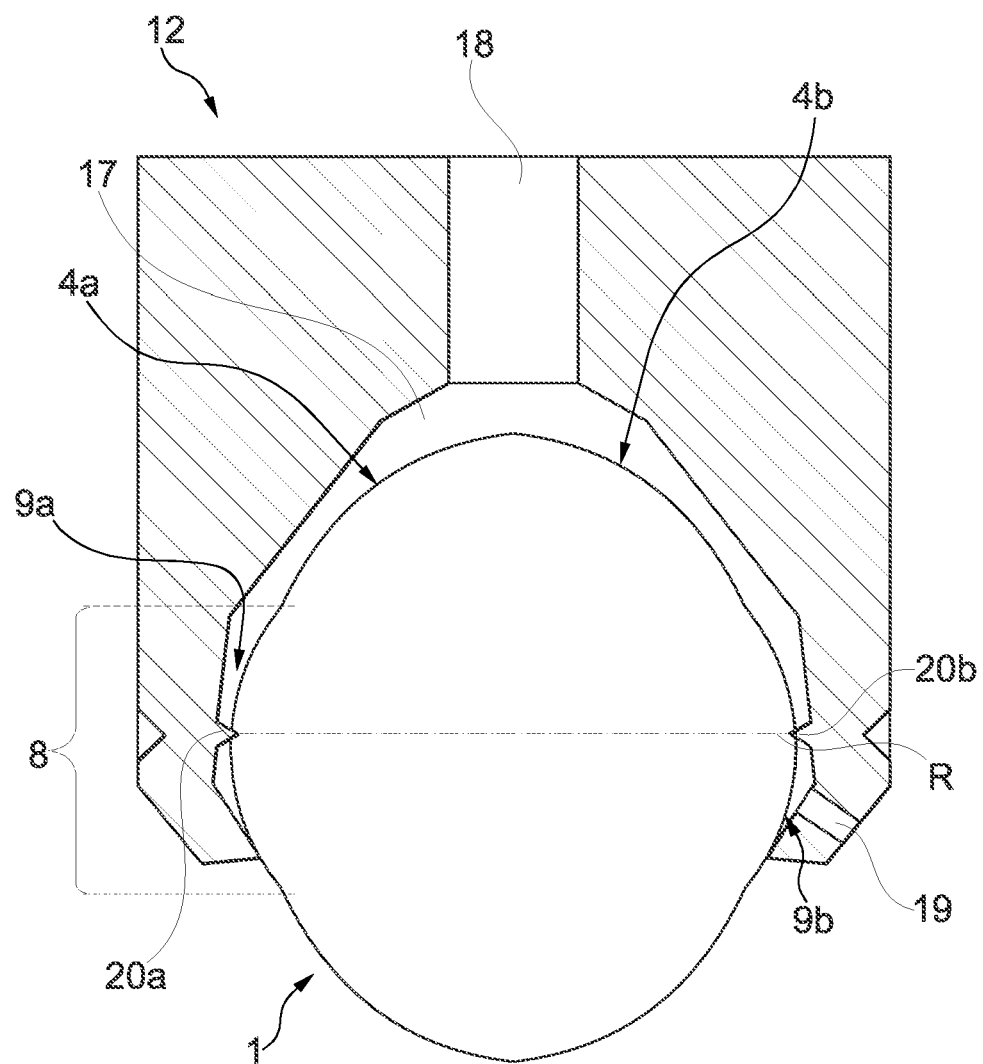
FIG. 7 shows a modified tool head with two centering devices that protrude into the holder.

The roll body 1 has a machining zone 2 and a retaining area 8. In the retaining area 8 the roll body 1 is held by the tool head 12, as shown in FIGS. 6a, 6b and 7. The machining zone 2 is shown in FIG. 3a in a first possible configuration and in FIG. 3b in a second possible configuration. The machining zone 2 is the area that touches the workpiece and is rolled during operation of rolling tool 10 (FIGS. 1, 2). The desired contour is worked into the workpiece in machining zone 2.

A maximum diameter D of the roll body 1 in the machining zone, measured along the center line L may be 20 millimeters, 10 millimeters, or 2 millimeters, for example.

The machining zone 2 has a working profile line 3 in cross section. The working profile line 3 includes a first working arc 4a and a second working arc 4b.

The first working arc 4a extends around a first working center point M4a and the second working arc 4b extends around a second working center M4b. The working centers M4a, M4b are located on a parallel P to the rotation axis R, offset to each other, to the central axis L and to the center Z. The radii R4a and R4b of the two working arcs 4a, 4b are of the same size, so that the working arcs 4a, 4b are symmetrical to each other, with the central axis L forming an axis of symmetry for this purpose. Due to this design and arrangement of the working arcs 4a, 4b, the two intersect at a point 5, which is located on the central axis L.

Figure 3B:
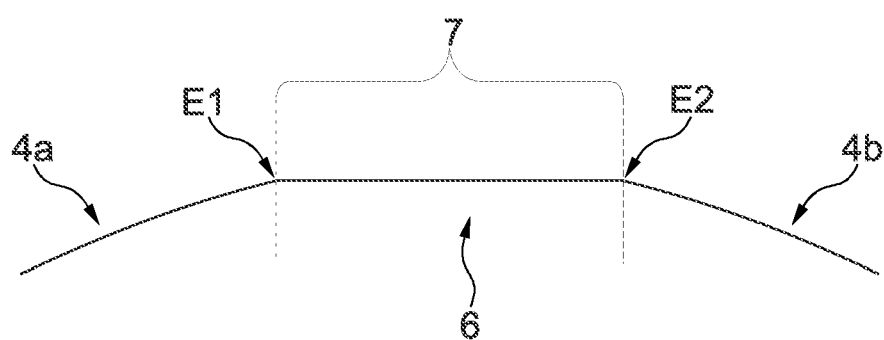
FIG. 3*b* shows a machining zone of the roll body in a second version.

As shown in FIG. 3b in a cross-sectional view of the machining zone, the tip 5 can be eroded and/or flattened so that the working profile line 3 has a line segment 6 in the cross-section of the roll body 1. In this way, a free area 7 can be created by line segment 6, which interrupts and/or divides machining zone 2. This means that the free area 7 is not used for working the workpiece, e.g., the free area 7 is arranged without contact with the workpiece during and/or during the rolling of the workpiece. This ensures, for example, that the desired contours are brought into the workpiece.

The line segment 6 is designed as a line that extends between the first working arc 4a and the second working arc 4b and connects the two working arcs 4a, 4b with each other. For example, the first working arc 4a ends in a first end E1 of line segment 6 and the second working arc 4b in a second end E2 of line segment 6. The line segment 6 runs parallel to the rotation axis R (FIG. 3a). In an alternative embodiment, line segment 6 can also be curved and/or bent.

As shown in FIGS. 4 and 5 in a cross-sectional view of roll body 1, roll body 1 has a retaining area 8. In the retaining area 8 the roll body 1 can be held on the rolling tool 10 as shown in FIGS. 6a, 6b and 7.

The retaining area 8 has a first retaining profile line 9a, which is formed in the cross-section of the roll body 1, and a second retaining profile line 9b, which is formed in the cross-section of the roll body 1. The retaining profile lines 9a, 9b are symmetrical to each other, with the central axis L forming the axis of symmetry for this purpose. The two retaining profile lines 9a, 9b end in two mouthpiece areas 16a, 16b, which are designed as radii.

As shown in FIG. 4, the first retaining profile line 9a forms a first retaining circle arc which extends around a first support point M9a located on the axis of rotation R. The second retaining profile line 9b forms a second retaining circle arc, which extends around a second retaining center M9b lying on the axis of rotation R.

As shown in FIG. 5, each of the two retaining profile lines 9a, 9b may include a first oval curve and a second oval curve 14a, 14b, which intersect at other tips 15a, 15b. The other tips 15a, 15b are arranged on the rotation axis R. In an example embodiment (not shown), each of the two retaining profile lines 9a, 9b has two retaining circle arcs instead of the oval curves 14a, 14b, the centers of which are offset to each other and to the axis of rotation R.

FIGS. 6a and 6b show a first tool head 12 of tool heads 12, 13 of rolling tool 10 from FIG. 1 or 2. The tool head 12 has a receptacle 17, which forms a cage for the roll body 1.

According to FIG. 6a, the roll body 1 from FIG. 4 is at least partially contained in receptacle 17. According to FIG. 6b, the roll body 1 from FIG. 5 is included in receptacle 17. The roll body 1 is held at the retaining area 8 in the receptacle 17.

The receptacle 17 forms a negative mold for the shape and/or contour of the roll body 1 to be arranged in it. The respective rolling bodies 1 are rotatably mounted in the receptacle 17. To this end, the receptacle 17 is slightly more voluminous than the roll body 1.

The rolling tool 10 (see FIGS. 1, 2) has a feed channel 18 which runs through the tool head 12, 13 and ends in the receptacle 17. A pressure and fluid source (not shown) can be assigned to the rolling tool 10, with which a pressurized fluid can be fed through the feed channel 18 into the receptacle 17. This allows the roll body 1 in the receptacle 17 to be hydrostatically loaded with force and rotated about the rotation axis R. A relief channel 19 is provided in the tool head 12, from which excess fluid can escape from the receptacle 17.

As shown in FIG. 7, two centering devices 20a, 20b can be provided in the tool head 12 for pre-positioning the roll body 1. The two centering devices 20a, 20b protrude into the receptacle 17 and are arranged opposite each other at the same height. They lie on the axis of rotation R and engage in the retaining area 8 at the holding profile lines 9a, 9b of the roll body 1.

REFERENCE NUMERALS

1 Rolling bodies
2 Machining zone
3 Working profile line
4a,b Working arcs
5 Tip
6 Line segment
7 Free area
8 Retaining area 9a,b Retaining circle arcs
10 Rolling tool
11 Base body
12 First tool head
13 Second tool head
14a,b Oval curves
15a,b Other tips
16a,b Mouthpiece areas
17 Receptacle
18 Supply channel
19 Bypass channel
20a,b Centering devices
L Central axis
M4a Center of the first machining arc
M4b Center of the second machining arc
P Parallel
R4a Radius of the first machining arc
R4b Radius of the second machining arc
Z Center

The invention claimed is:

1. A roll body for a hydrostatic rolling tool, comprising:
a center;
an axis of rotation running through the center;
a machining zone for rolling a workpiece, wherein:
 the roll body is rotatable about the axis of rotation;
 the machining zone comprises a working profile line formed in a cross-section of the roll body;
 the working profile line comprises:
  a first working arc extending around a first machining center; and
  a second working arc extending around a second machining center;
 the first machining center is arranged offset to the center; and
 the second machining center is arranged offset to the center and offset to the first machining center.

2. The roll body of claim 1, further comprising a parallel to the axis of rotation, wherein:
the first machining center lies on the parallel in the cross-section; and
the second machining center lies on the parallel in the cross-section.

3. The roll body of claim 1, further comprising a central axis running through the center and perpendicular to the axis of rotation, wherein the central axis forms an axis of symmetry for the first working arc and the second working arc.

4. The roll body of claim 1, wherein the first working arc and the second working arc intersect in the cross-section to form a tip.

5. The roll body of claim 1, wherein:
the working profile line comprises a line section comprising a first end and a second end;
the first working arc opens into the first end; and
the second working arc opens into the second end.

6. The roll body of claim 1 further comprising a retaining area for holding the roll body on the hydrostatic rolling tool, the retaining area comprising:
a first retaining center lying on the axis of rotation;
a first retaining profile line comprising a first retaining circular arc extending around the first retaining center in the cross-section;
a second retaining center lying on the axis of rotation; and
a second retaining profile line comprising a second retaining circular arc extending around the second retaining center in the cross-section.

7. The roll body of claim 1 further comprising a retaining area for holding the roll body on the hydrostatic rolling tool, the retaining area comprising:
a first retaining profile line comprising:
 a first retaining circle arc or a first oval curve, the first retaining circle arc or the first oval curve comprising a first support center offset relative to the axis of rotation; and
 a second retaining circle arc or a second oval curve, the second retaining circle arc or the second oval curve comprising a second support center offset relative to the axis of rotation and to the first support center; and
a second retaining profile line comprising:
 a third retaining circle arc or a third oval curve, the third retaining circle arc or the third oval curve comprising a third support center offset relative to the axis of rotation; and
 a fourth retaining circle arc or a fourth oval curve, the fourth retaining circle arc or the fourth oval curve comprising a fourth support center offset relative to the axis of rotation and to the third support center.

8. A hydrostatic rolling tool comprising the roll body of claim 1 arranged for rolling the workpiece.

9. The hydrostatic rolling tool of claim 8 further comprising a tool head, wherein:
the tool head comprises a receptacle; and
the roll body is at least partially disposed in the receptacle.

10. The hydrostatic rolling tool of claim 9, further comprising a plurality of tool heads arranged with respective roll bodies, the plurality of tool heads arranged about a circumference of the hydrostatic rolling tool or along an axis of the hydrostatic rolling tool such that passive forces from rolling a workpiece are canceled out.

* * * * *